United States Patent
Morein

(10) Patent No.: US 10,247,317 B2
(45) Date of Patent: Apr. 2, 2019

(54) ROTARY VALVE WITH AN ISOLATING DISTRIBUTION BODY

(71) Applicant: Schaeffler Technologies AG & Co. KG, Herzogenaurach (DE)

(72) Inventor: Alexander Joseph Morein, Royal Oak, MI (US)

(73) Assignee: SCHAEFFLER TECHNOLOGIES AG & CO. KG, Herzogenaurach (DE)

(*) Notice: Subject to any disclaimer, the term of this patent is extended or adjusted under 35 U.S.C. 154(b) by 0 days.

(21) Appl. No.: 15/709,891

(22) Filed: Sep. 20, 2017

(65) Prior Publication Data

US 2018/0010701 A1 Jan. 11, 2018

Related U.S. Application Data

(62) Division of application No. 14/729,409, filed on Jun. 3, 2015, now Pat. No. 9,803,760.

(60) Provisional application No. 62/008,190, filed on Jun. 5, 2014.

(51) Int. Cl.
*F16K 11/085* (2006.01)
*F16K 27/06* (2006.01)

(52) U.S. Cl.
CPC ........ *F16K 11/0853* (2013.01); *F16K 27/065* (2013.01); *Y10T 137/86871* (2015.04)

(58) Field of Classification Search
None
See application file for complete search history.

(56) References Cited

U.S. PATENT DOCUMENTS

| | | |
|---|---|---|
| 3,166,098 A | 1/1965 | Jennings |
| 3,194,267 A | 7/1965 | Lyon |
| 3,411,986 A | 11/1968 | Buchberger |
| 4,445,540 A | 5/1984 | Baron |
| 4,614,204 A | 9/1986 | Dolejs |
| 4,702,269 A | 10/1987 | Schuler |
| 5,375,622 A | 12/1994 | Houston |
| 5,529,758 A | 6/1996 | Houston |
| 5,927,330 A | 7/1999 | Minton |
| 6,308,739 B1 | 10/2001 | Barbuto |
| 6,698,452 B2 | 3/2004 | Sisk |
| 7,117,882 B2 | 10/2006 | Blomgren |
| 7,131,460 B2 | 11/2006 | McLane |
| 7,950,376 B2 | 5/2011 | Rollet |
| 8,800,667 B2 | 8/2014 | Seim |

FOREIGN PATENT DOCUMENTS

| | | |
|---|---|---|
| DE | 102006055536 | 6/2008 |
| GB | 2190014 | 11/1987 |

*Primary Examiner* — John Fox
(74) *Attorney, Agent, or Firm* — Volpe and Koenig, P.C

(57) ABSTRACT

A rotary valve is provided including a housing with an inner chamber having a first inlet, a first outlet, a second inlet, and a second outlet. A valve body is rotatably positioned in the housing. The valve body includes at least one isolated fluid pathway that, depending upon a rotational position of the valve body, provides at least one of a direct connection of one or more of the inlets to one or more of the outlets, or permits flow from at least an other one of the inlets or the outlets that are not in the direct connection created by the at least one isolated fluid pathway into or from the inner chamber. At least one actuator controls the position of the valve body.

8 Claims, 4 Drawing Sheets

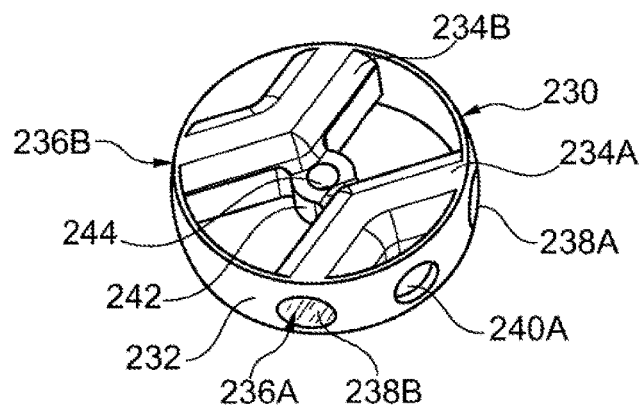
Fig. 9
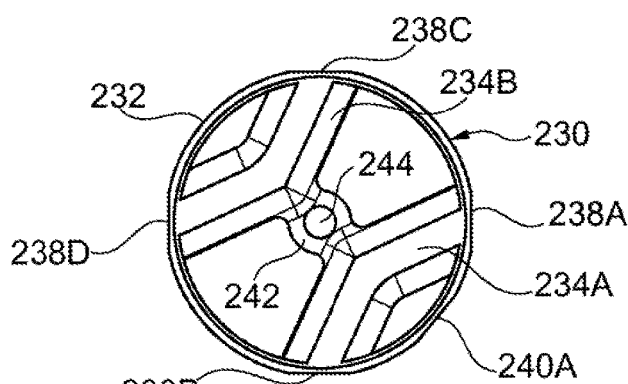
Fig. 10
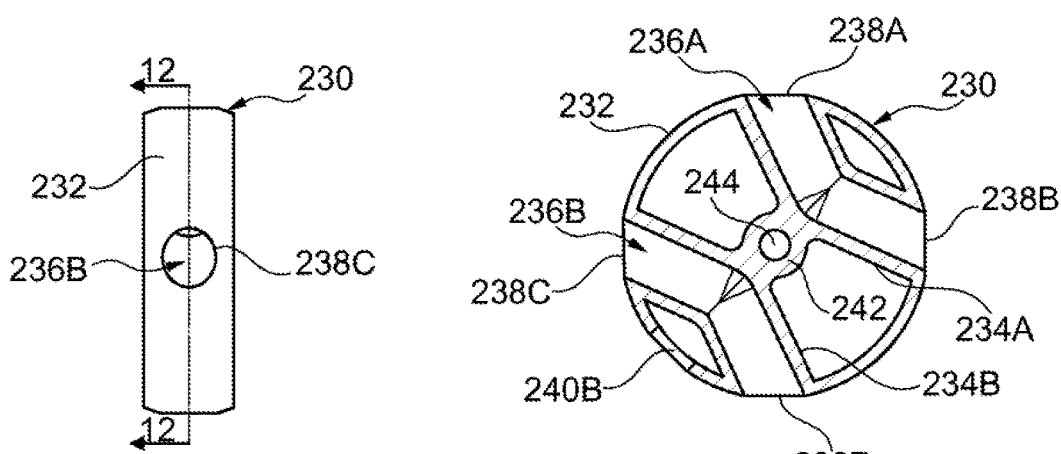
Fig. 11
Fig. 12

ROTARY VALVE WITH AN ISOLATING DISTRIBUTION BODY

INCORPORATION BY REFERENCE

The following documents are incorporated herein by reference as if fully set forth: U.S. Provisional Patent Application No. 62/008,190, filed Jun. 5, 2014, and U.S. patent application Ser. No. 14/729,409, filed Jun. 30, 2015.

FIELD OF INVENTION

The present invention relates to rotary valves used, for example, to direct coolant flows in vehicles, particularly for direction of coolant flows in connection with the engine and various other systems in motor vehicles, and in particular to an isolating distribution valve body for such valves.

BACKGROUND

In automotive applications, there is a push for energy efficiency. One way to increase efficiency of motor vehicles is to control the coolant flows to and from the internal combustion engine so that the engine operates at an optimal operating temperature. It has been known to use switchable coolant pumps so that the coolant flow is switched off and the engine heats up from a cold start more quickly. Additionally, throttling of coolant flows is known using a thermal management module; however, these known thermal management module valves generally only allow a single outlet temperature.

One known prior art valve used in connection with a thermal management system is disclosed in DE 10 2006 055 536. In this case, a rotary valve having two coaxial rotary valve bodies located within a housing are provided. Here the inlet is in an axial direction and, depending upon the location of the coaxial valve bodies, the coolant flow is directed to a first or second outlet that can be separately switched off and on in order to control the flow of coolant from the water pump to various heat exchangers used in connection with the engine and various other systems, such as an oil cooler. However, there is no possibility for providing isolated flows to and from the device.

It would be desirable to provide a way for allowing a flow through such a rotary valve that is isolated from the chamber within the housing, in order to allow the possibility of a direct transfer of fluid through the valve without mixing with other fluid streams, for example for conveying coolant from a given source, for example at one temperature, to a specific motor vehicle system and/or component.

SUMMARY

Briefly stated, a rotary valve is provided having a housing with an inner chamber. A first inlet, a first outlet, a second inlet, and a second outlet are located on the housing. A valve body is rotatably positioned in the housing. The valve body includes at least one isolated fluid pathway that, depending upon a rotational position of the valve body, provides at least one of a direct connection of one or more of the inlets to one or more of the outlets, and permits flow from at least an other one of the inlets or the outlets that are not in the direct connection created by the at least one isolated fluid pathway into or from the inner chamber. At least one actuator controls the position of the valve body.

In one preferred arrangement, an axial inlet is also located on the housing and connects to the inner chamber.

Preferably, the at least one isolated fluid pathway is a single fluid pathway and provides the direct connection between one of the inlets and one of the outlets. However, additional embodiments are provided and envisioned in which the at least one isolated fluid isolated pathway provides the direct connection between several of the inlets and one of the outlets, several of the outlets and one of the inlets, or several of the inlets and several of the outlets.

Preferably, housing includes seals located at an interface between the inlets and the valve body and the outlets in the valve body. While seals are preferred, it is also possible to also provide an arrangement without seals which allows some minimal fluid flow between the valve body and the inner chamber of the housing.

In another aspect, the at least one isolated fluid pathway includes a throttle in order to restrict or control flow therethrough.

In a preferred arrangement, the valve body is shaped as a spherical frustum. One preferred arrangement provides that the housing has the first inlet adjacent to the first outlet and the second inlet adjacent to the second outlet and in a first rotary position of the valve body, the direct connection is between the first inlet and the first outlet, and in a second rotary position of the valve body, the direct connection is between the second inlet and the second outlet. However, other arrangements are possible.

Another preferred arrangement provides the at least one isolated fluid pathway includes three openings, and in a first rotary position of the valve body, the direct connection is between the first and second inlets and the first outlet, and in a second rotary position of the valve body, the direct connection is between the first inlet and the first and second outlets.

Preferably, an actuator shaft extends through the housing and is connected to the valve body for rotary positioning of the valve body.

In a preferred construction, the valve body comprises an outer wall connected to a center hub by a tube structure that forms the at least one isolated fluid pathway. An opening can be located in the wall that permits flow from at least one of the other ones of the inlets or the outlets that are not in the direct connection created by the at least one isolated fluid pathway into or from the inner chamber. This allows for mixing of a fluid flow within the inner chamber.

Further aspects of the invention can be discerned from the detailed description and claims which follow.

BRIEF DESCRIPTION OF THE DRAWINGS

The foregoing Summary and the following detailed description will be better understood when read in conjunction with the appended drawings, which illustrate a preferred embodiment of the invention. In the drawings:

FIG. 9 is a perspective view of a fourth embodiment of the rotary valve.

FIG. 10 is a top plan view of the valve body shown in FIG. 9.

FIG. 11 is an elevational view of the valve body shown in FIG. 9.

FIG. 12 is a cross-sectional view taken along line 12-12 in FIG. 11.

DETAILED DESCRIPTION OF THE PREFERRED EMBODIMENTS

Figure 1:
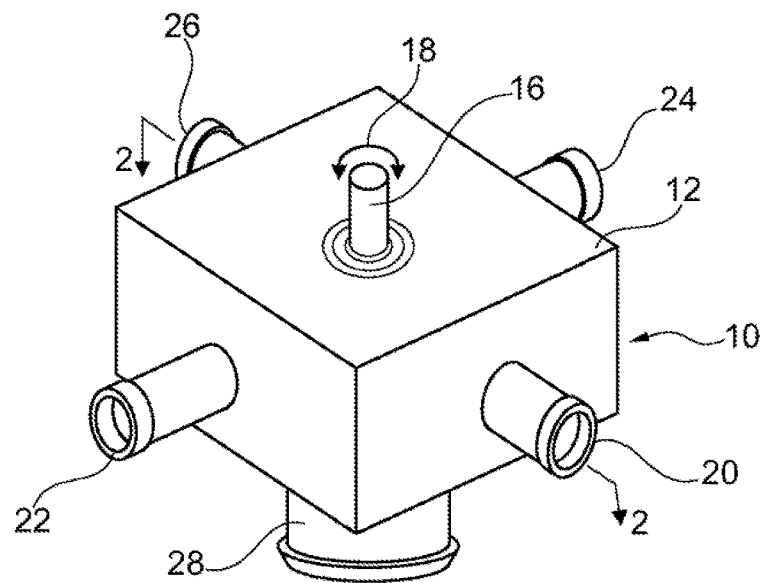
FIG. 1 is a perspective view showing a rotary valve according to one preferred embodiment of the present invention.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft or rotating part. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 2:
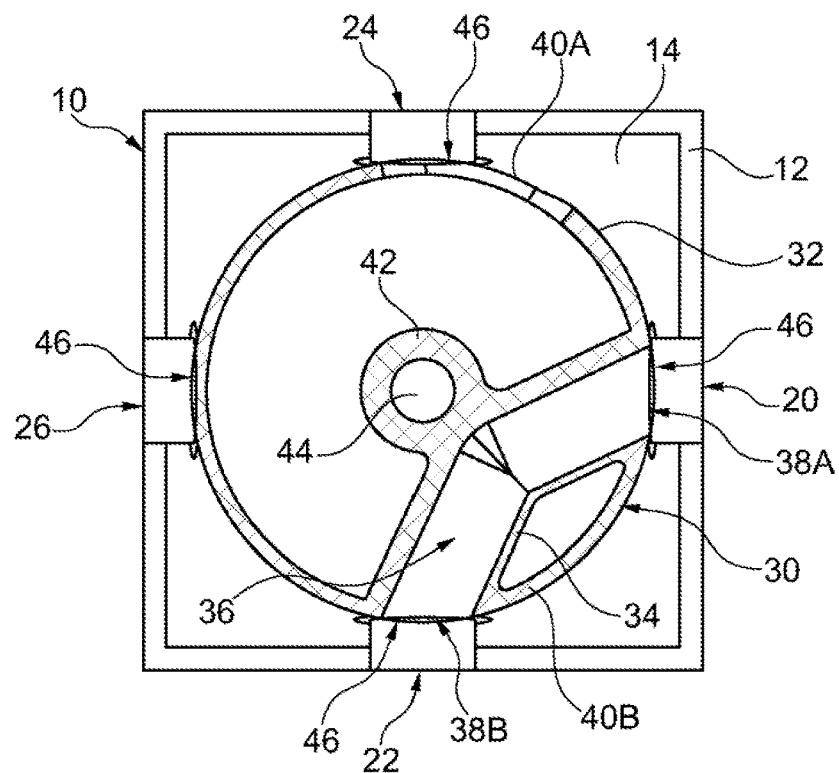
FIG. 2 is a cross-sectional view through the rotary valve of FIG. 1 taken along line 2-2 in FIG. 1.

Referring now to FIGS. 1-6, a first embodiment of a rotary valve 10 in accordance with the present invention is shown. The rotary valve 10 includes a housing 12 having an inner chamber 14 as indicated in FIG. 2. While the housing 12 is represented as a parallelepiped, it could have other forms including a generally cylindrical form, if desired. As shown in FIG. 1, an actuator shaft 16 extends from the housing 12 and is preferably supported by a bearing and seal arrangement. The actuator shaft 16 is preferably connected to a rotary actuator, represented by arrow 18 in FIG. 1, for rotary actuation of the valve body 30, shown in FIG. 2 and in detail in FIGS. 3-6.

A first inlet 20, a first outlet 22, a second inlet 24, and second outlet 26 are connected to the housing 12. More or less inlets and/or outlets could be provided, depending upon the particular application. The housing 12 and the inlets and outlets 20, 22, 24, 26 can be made of one piece of material, for example cast or machined aluminum, or a molded polymeric material. Alternatively, they can be made from separate pieces and assembled together via flanged connections (not shown).

Still with reference to FIG. 1, an axial inlet and/or outlet 28 can be provided connected to the housing 12 that is also in communication with the inner chamber 14. In one preferred arrangement, this is an axial inlet 28.

Referring now to FIGS. 2-6, the valve body 30 is shown in detail. The valve body 30 is rotatably positioned in the housing 12, preferably mounted to the shaft 16. The valve body 30 includes a tubular structure 34 that defines at least one isolated fluid pathway 36 that, dependent upon a rotational position of the valve body 30, provides at least one of a direct connection of one or more of the inlets 20, 24 to one or more of the outlets 22, 26, or permits flow from at least an other one of the inlets 20, 24 or the axial inlet 28 to one or more of the outlets 22, 26 that are not in the direct connection created by the at least one isolated fluid pathway 34 into or from the inner chamber 14. The tubular structure 34 can be machined, molded or otherwise formed on the valve body 30, and extends between two pathway openings 38A, 38B that extend to the wall 32 that defines the outside of the valve body 30. The isolated fluid pathway 36 provides a direct connection between one of the inlets 20, 24 and one of the outlets 22, 26. The inlets or outlets being connected can be varied depending upon the rotary position by rotating the valve body 30 through 90° increments from the position shown in FIG. 2. Additional openings 40A, 40B are preferably provided through the wall 32 of the valve body 30 in order to allow communication between one or more of the other ones of the inlets or the outlets 20, 22, 24, 26 that are not in the direct connection created by the at least one isolated fluid pathway 36 to the inner chamber 14. For example, as shown in FIG. 2, the second inlet 24 is in communication with the inner chamber 14 via the additional opening 40A in the wall 32 of the valve body 30. Here, it can be seen that by rotating the valve body 30 shown in FIG. 2 counterclockwise by approximately 45°, both the first inlet 20 and the second inlet 24 would be in communication with the inner chamber 14 via the additional openings 40A and 40B, while both the first and second outlets 22, 26 would be closed by the wall 32 of the valve body 30.

Figure 3:
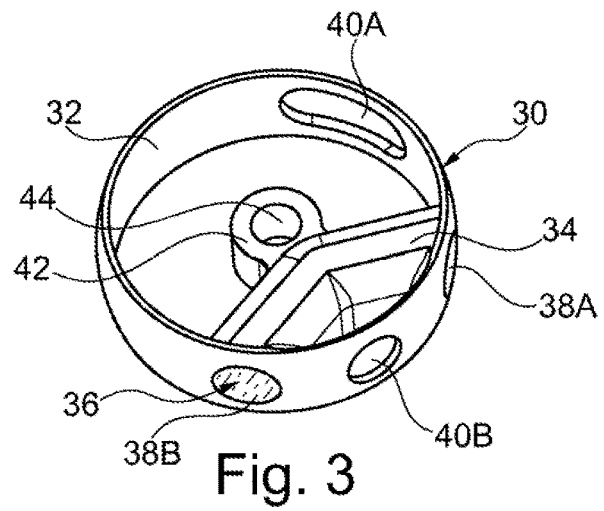
FIG. 3 is a perspective view of the rotary valve shown in FIGS. 1 and 2.
Figure 5:
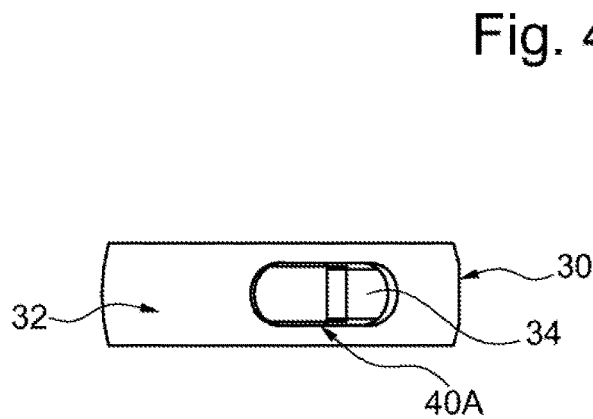
FIG. 5 is an elevational view taken along line 5-5 in FIG. 4.
Figure 6:
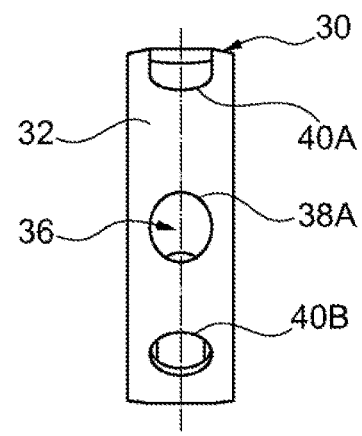
FIG. 6 is a side elevational view taken along line 6-6 in FIG. 4.

As shown in detail in FIGS. 3, 5, and 6, the wall 32 of the valve body 30 is preferably in the form of a spherical frustum and the contact areas with the inlet 20, 24 and outlets 22, 26 are preferably also complementarily shaped in order to provide a seal. Separate seals 46 can also be provided on the housing 12 at an interface between the inlets 20, 24 and the valve body 30 and the outlets 22, 26 and the valve body 30. The seals 46 are preferably formed of an polymeric material. Other suitable materials can be used depending upon the particular application and fluid being handled by the rotary valve 10.

Figure 4:
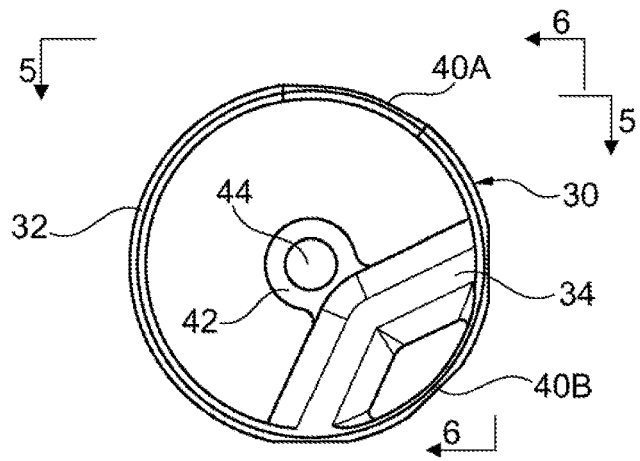
FIG. 4 is a top plan view of the valve body shown in FIG. 3.

As shown in detail in FIGS. 3 and 4, the outer wall 32 is connected to the center hub 42 by the tube structure 34 that forms the fluid pathway 36. An opening 44 is formed in the center hub in which the shaft 16 is connected for rotary movement of the valve body 30.

While the first embodiment of the rotary valve 10 is shown with two inlets 20, 24 and two outlets 22, 26 that are controlled by the valve body 30, those skilled in the art will recognize that more or less inlets and/or outlets could be provided depending upon the particular application.

Figure 7:
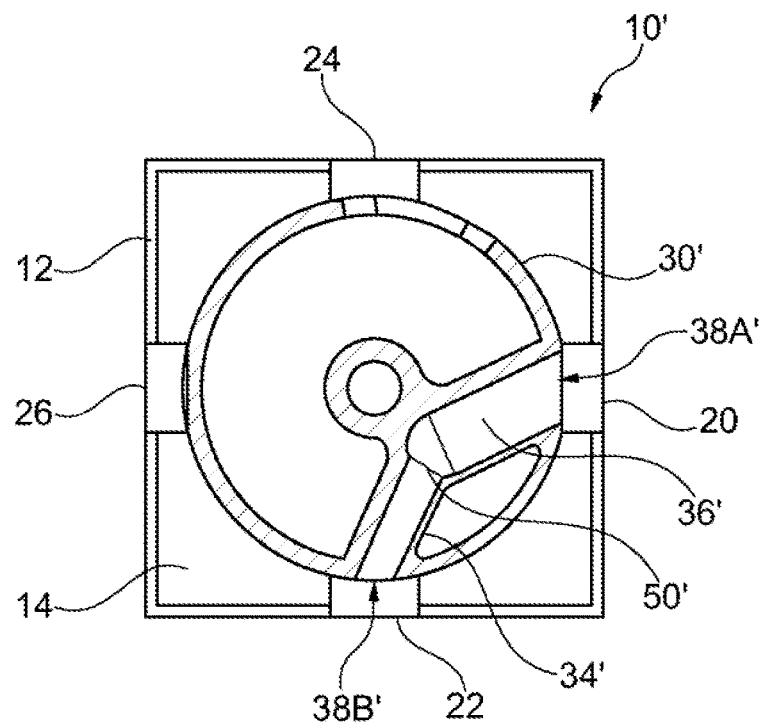
FIG. 7 is a cross-sectional view of a second embodiment of the rotary valve.

Referring now to FIG. 7, a second embodiment of the rotary valve 10' is shown. The second embodiment of the rotary valve 10' is the same as the rotary valve 10 except as described in detail below.

In the second embodiment of the rotary valve 10', the valve body 30' includes a tube structure 34' that forms the isolated fluid pathway 36' that extends between the openings 38A', 38B'. Within the isolated fluid pathway 36', a throttle 50' is formed by narrowing the flow path between the first opening 38A' and the second opening 38B' in order to throttle and/or restrict the fluid flow. This can control the relative amount of fluid entering or leaving the fluid pathway.

Figure 8:
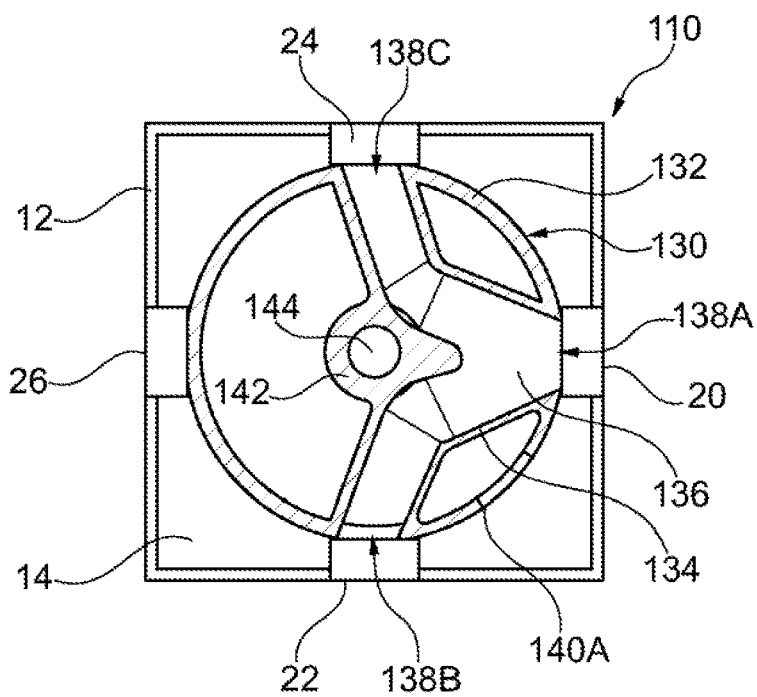
FIG. 8 is a cross-sectional view of a third embodiment of the rotary valve.

Referring now to FIG. 8, a third embodiment of the rotary valve 110 is shown. The rotary valve 110 is similar to the valve 10 and utilizes the same housing 12. Here, however, the valve body 130 includes an isolated fluid pathway 136 with three pathway openings 138A, 138B, 138C formed by tubular structure 134. Here, the arrangement allows a connection between the first and second inlets 20, 24 and the first outlet 22 in the position shown, as well as various connections between two of the inlets 20, 24 and one outlet 22, 26 or two of the outlets 22, 26 and one of the inlets 20, 24 by rotating the valve body 132 in 90° increments. An additional opening 140A can provide communication between any of the inlets or outlets 20, 22, 24, 26 and the inner chamber 14 of the housing 12. While only one additional opening 140A is shown, further additional openings could be provided in the wall 132 of the valve body 130. The hub 142 and hub opening 144 are similar to the hub 42 and hub opening 44 described above.

Referring now to FIGS. 9-12, a valve body 230 for use in connection with a fourth embodiment of the rotary valve is shown. The rotary valve is similar to the valve 10, 110 and would utilize the same housing 12. Here, however, the valve body 230 has a spherical frustum wall 232 and includes two isolated fluid pathways 236A, 236B formed by tubular structures 234A, 234B. The first isolated fluid pathway 236A has two pathway openings 238A, 238B, and the second isolated fluid pathway 236A has two pathway openings 238C, 238D. Here, the valve body 230 allows a connection between a first adjacent pair of inlets and outlets (20, 22, 24, 26 in FIG. 1) via the first isolated fluid pathway 236A, while at the same time providing a connection between the opposite pair of inlets and/or outlets (20, 22, 24, 26 in FIG. 1) via the second isolated fluid pathway 236B, which can be changed by rotating the valve body 230 in 90° increments. An additional opening 240A can provide communication between any of the inlets or outlets (20, 22, 24, 26 in FIG. 1) and the inner chamber of the valve housing. While only one additional opening 240A is shown, further additional openings could be provided in the wall 232 of the valve body 230. The hub 242 and hub opening 244 are similar to the hub 42 and hub opening 44 described above.

While several different isolated fluid pathways 36, 36', 136 have been shown and discussed in the specific embodiments above, those skilled in the art will recognize that the tubular structure 34, 34', 134 could be modified to provide different pathway configurations, as desired, depending on the particular application.

Accordingly, the rotary valve 10, 10', 110 can be designed with one or more inlets that are in direct, isolated communication with one or more outlets, depending upon the rotational position of the valve body 30, 30', 130, 230 while others of the inlets and/or outlets are in communication with the inner chamber of the housing to allow for mixing of the fluid flows through the rotary valve. This can be used, in particular, in connection with cooling fluid pathways in the motor vehicle industry in order to allow flows at different temperatures to be mixed or passed directly through the rotary valve 10, 10', 110 in an isolated manner, depending upon the particular configuration and the particular operating conditions of the motor vehicle. This allows for different fluid mixing and distribution strategies to be utilized in order suit particular applications. Thus, the rotary valve 10, 10', 110 allows for fluid flows to be selectively mixed or isolated without the need for separate valve chambers.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A rotary valve, comprising:
a housing having an inner chamber;
a plurality of passages including a first inlet, a first outlet, a second inlet, and a second outlet on the housing;
a valve body rotatably positioned in the housing, the valve body including a first isolated fluid pathway and a second isolated fluid pathway that, dependent upon a rotational position of the valve body, both
(a) provides a first direct connection between a first adjacent pair of passages of the plurality of passages, and a second direct connection between a second adjacent pair of passages of the plurality of passages, and
(b) permits flow via an opening formed in a radially outer wall of the valve body between:
(1) one of the passages of the plurality of passages that are not aligned with the direct connections created by the first isolated fluid pathway and the second isolated fluid pathway, and
(2) the inner chamber,
wherein the opening is circumferentially positioned between (i) ends of the first isolated fluid pathway, or (ii) ends of the second isolated fluid pathway; and
at least one actuator that controls the position of the valve body.

2. The rotary valve of claim 1, further comprising an axial inlet located on the housing that connects to the inner chamber.

3. The rotary valve of claim 1, wherein the housing includes seals located at an interface between the inlets and the valve body and the outlets and the valve body.

4. The rotary valve of claim 1, wherein the valve body is shaped as a spherical frustum.

5. The rotary valve of claim 1, wherein the first inlet is adjacent to the first outlet and the second inlet is adjacent to the second outlet, and in a first rotary position of the valve body, the first direct connection is between the first inlet and the first outlet, and the second direct connection is between the second inlet and the second outlet.

6. The rotary valve of claim 1, wherein an actuator shaft extends through the housing and is connected to the valve body for rotary positioning of the valve body.

7. The rotary valve of claim 6, wherein the radially outer wall is connected to a center hub by a tube structure that forms the first isolated fluid pathway and the second isolated fluid pathway.

8. A rotary valve, comprising:
a housing having an inner chamber;
a plurality of passages including a first inlet, a first outlet, a second inlet, and a second outlet on the housing;
a valve body rotatably positioned in the housing, the valve body including a first isolated fluid pathway and a second isolated fluid pathway that, dependent upon a rotational position of the valve body, both
(a) provides a first direct connection between a first adjacent pair of passages of the plurality of passages, and a second direct connection between a second adjacent pair of passages of the plurality of passages, and
(b) permits flow via an opening formed in a radially outer wall of the valve body between:

(1) one of the passages of the plurality of passages that are not aligned with the direct connections created by the first isolated fluid pathway and the second isolated fluid pathway, and
(2) the inner chamber to an axial inlet or outlet located on the housing that connects to the inner chamber; and at least one actuator that controls the position of the valve body.

\* \* \* \* \*